(12) United States Patent
Wang et al.

(10) Patent No.: US 8,180,008 B2
(45) Date of Patent: May 15, 2012

(54) SINGLE WIRE TRANSMISSION WITHOUT CLOCK SYNCHRONIZATION

(75) Inventors: Chih-Ching Wang, Hsinchu (TW); Jing-Meng Liu, Jubei (TW); Dah-Chih Lin, Hsin-Chu (TW)

(73) Assignee: Richtek Technology Corporation, Hsin-Chu (TW)

( * ) Notice: Subject to any disclaimer, the term of this patent is extended or adjusted under 35 U.S.C. 154(b) by 1178 days.

(21) Appl. No.: 11/801,820

(22) Filed: May 12, 2007

(65) Prior Publication Data
US 2008/0080652 A1   Apr. 3, 2008

(30) Foreign Application Priority Data
Oct. 2, 2006   (TW) ................................ 95136558 A (51) Int. Cl.
*H04L 7/02* (2006.01)

(52) U.S. Cl. ........................................ 375/359; 375/354
(58) Field of Classification Search .................... 375/359
See application file for complete search history.

(56) References Cited

U.S. PATENT DOCUMENTS

| | | | |
|---|---|---|---|
| 2003/0219004 A1* | 11/2003 | Liu et al. | 370/350 |
| 2005/0200388 A1* | 9/2005 | Har et al. | 327/103 |
| 2006/0164267 A1* | 7/2006 | Fitzgibbon et al. | 341/51 |

* cited by examiner

*Primary Examiner* — Shuwang Liu
*Assistant Examiner* — Michael Neff
(74) *Attorney, Agent, or Firm* — Tung & Associates (57) ABSTRACT

The present invention discloses a method for single-wire transmission without clock synchronization, comprising: providing three states; defining a spacing bit by a first state of the three states; and defining data signals, a start signal and an end signal by combinations of the second and third states of the three states.

12 Claims, 10 Drawing Sheets

SINGLE WIRE TRANSMISSION WITHOUT CLOCK SYNCHRONIZATION

FIELD OF THE INVENTION

The present invention relates to a method for single wire transmission. More particularly, the present invention relates to a method for single wire transmission without clock synchronization.

BACKGROUND OF THE INVENTION

Figure 1:
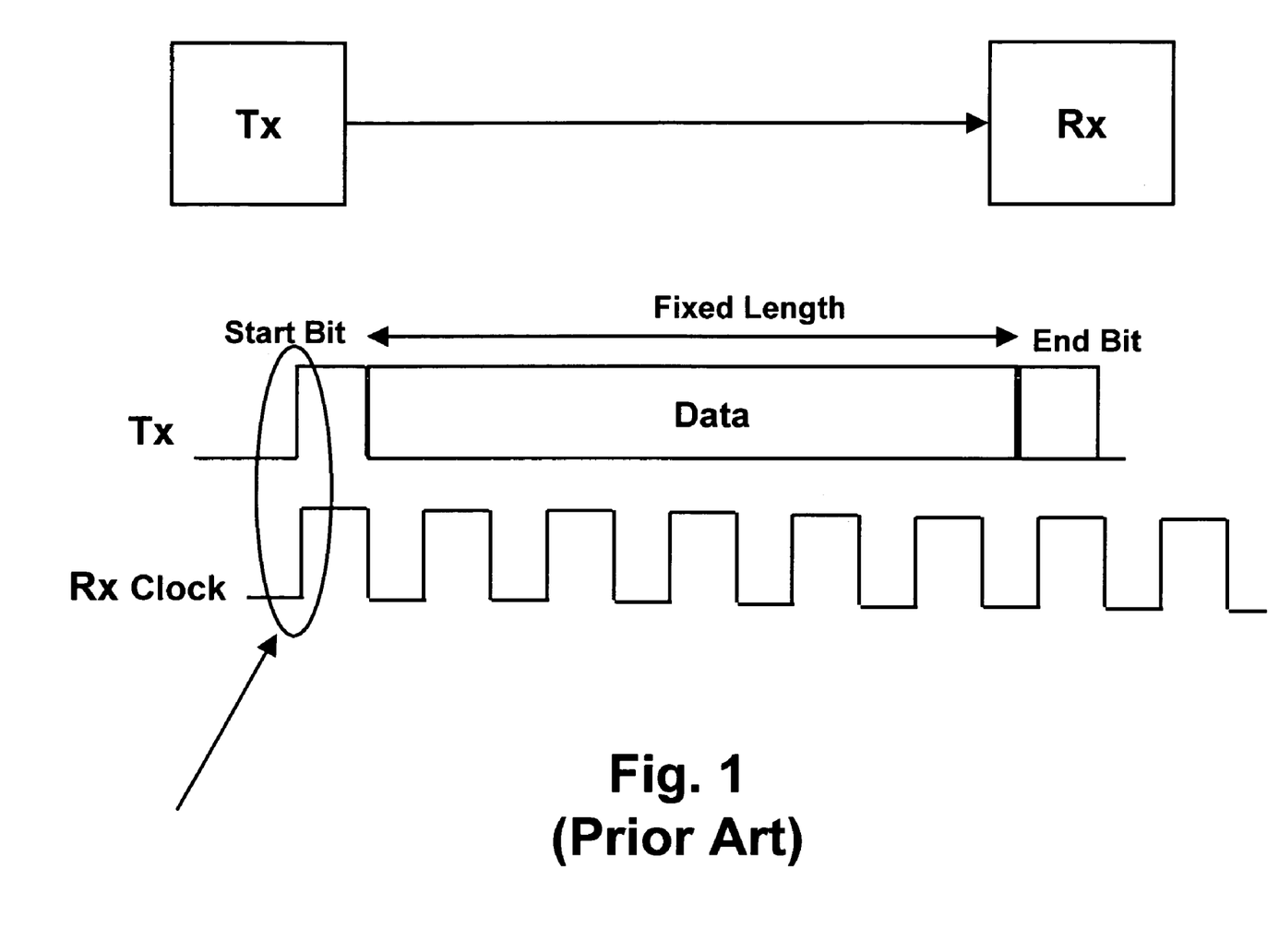
FIG. 1 is a diagram showing a prior method for single wire transmission.

FIG. 1 is a diagram showing a prior method for single wire transmission, wherein a signal is transmitted from a transmitting end Tx to a receiving end Rx. The signal includes a start bit, data with a predetermined length (the data can be a command code, a numeric code, or a command code combined with a numeric code), and an end bit. As the arrow in FIG. 1 shows, when the start bit is received at the receiving end Rx, a clock signal is generated synchronously with the rising edge of the start bit. Then the data is received, and the length of the data is counted according to the clock signals. The length of the data should comply with a communication protocol predetermined between the transmitting end Tx and the receiving end Rx. The above method belongs to synchronized transmission, because the transmitting end Tx has to transmit data synchronously with the clock frequency of the receiving end Rx.

A shortcoming of the above single wire transmission is that the transmitting end Tx has to know the clock frequency of the receiving end Rx in advance. Furthermore, the transmitting end Tx has to properly arrange set-up time and hold time of the transmitted signals to make sure that the data can be received correctly.

Figure 2:
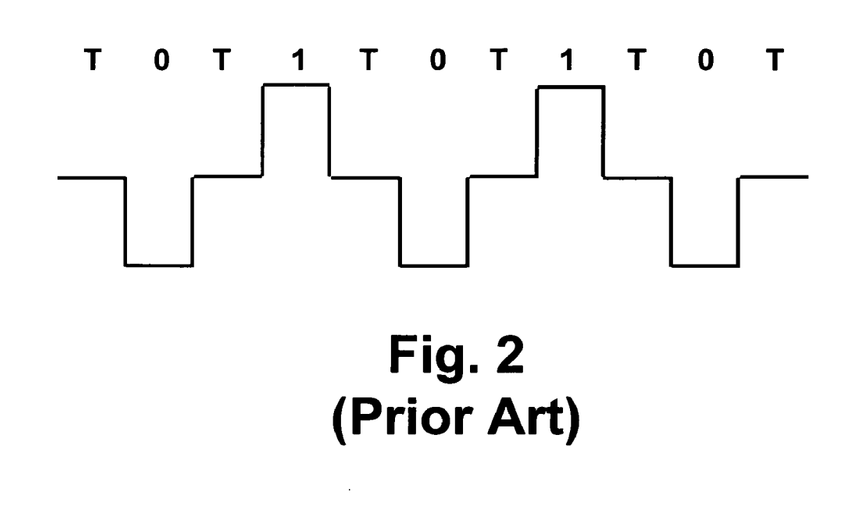
FIG. 2 is a diagram showing a prior arrangement for tri-state data definition.

FIG. 2 is a diagram showing a conventional arrangement for tri-state single wire transmission, wherein there are three states for a data signal, including "0", "1", and "T" (third-state).

U.S. patent publication No. 2003/0219004 discloses a method for single wire transmission using tri-state signals. One of the three states may be used as a synchronization bit, and the receiving end can generate clock signals according to the synchronization bits for synchronization with the transmitting end. This method also belongs to synchronized transmission, but is different from the previous method in that it uses tri-state signals, and that the synchronization is achieved by the receiving end following the synchronization protocol defined by the synchronization bits, instead of the transmitting end following the predefined synchronization protocol.

In the above-mentioned prior methods, clock synchronization is a "must", either by the transmitting end following the predefined synchronization protocol, or by the receiving end following the synchronization protocol defined by the synchronization bits. Either way, it creates a burden for circuit design or communication protocol.

However, if clock synchronization is not established, it is difficult to identify signals received at the receiving end.

In view of the foregoing, it is desired to provide a method for single wire transmission which does not require clock synchronization between a transmitting end and a receiving end, wherein signals received at the receiving end can be identified clearly.

SUMMARY

It is therefore an objective of the present invention to provide a method for single wire transmission without clock synchronization, and the signals received at the receiving end can be identified clearly.

It is another objective of the present invention to provide a method for single wire transmission without clock synchronization, wherein an error in the received signals can be detected timely.

In accordance with the foregoing and other objectives of the present invention, and as disclosed by one embodiment of the present invention, a method for single wire transmission without clock synchronization is provided, which comprises: providing at least three states; defining a spacing bit by one state of the three states; and defining data signals, a start signal and an end signal by one-bit and two-bit combinations of the other states of the three states.

In addition, in accordance with another embodiment of the present invention, a method for single wire transmission without clock synchronization is provided, which comprises: providing at least three states; defining a spacing bit by a first state of the three states; and defining data signals, a start signal and an end signal according to the number of occurrence of a second state of the three states.

Furthermore, in accordance with yet another embodiment of the present invention, a method for single wire transmission without clock synchronization is provided, which comprises: providing at least three states; defining a spacing bit by a first state of the three states, and using a second state and a third state of the three states as signal defining bits; interposing a spacing bit between every the signal defining bit; and defining data signals, a start signal and an end signal by at least three signal defining bits.

And, in accordance with yet another embodiment of the present invention, a method for single wire transmission without clock synchronization is provided, which comprises providing at least three states; defining a spacing bit by a first state of the three states, and using a second state and a third state of the three states as signal defining bits; interposing a spacing bit between every the signal defining bit; and defining data signals, a start signal and an end signal by at least four signal defining bits.

In accordance with the above embodiments of the present invention, by selecting proper combinations of signal defining bits, it can eliminate the possibility that the start signal or the end signal is misread due to misalignment of other signals. Or, it can eliminate the possibility that the data signal, the start signal or the end signal is misread due to misalignment of other signals. Or, it can eliminate the possibility that the data signal, the start signal or the end signal is misread due to misalignment of itself or other signals.

The foregoing general descriptions and the following detailed embodiments are provided to make these and other features, aspects, functions and advantages of the present invention better understood. However, they are provided as examples, for illustration rather than limiting the scope of the invention.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the present invention, "bit" means one transmission state; "signal" means one bit or a series of bits which constitute a meaningful unit, that is, one of the data signals, the start signal or the end signal; "a series of signals" means at least two signals. A "signal" may be one bit, or may be expressed by at least two bits.

Figure 3:
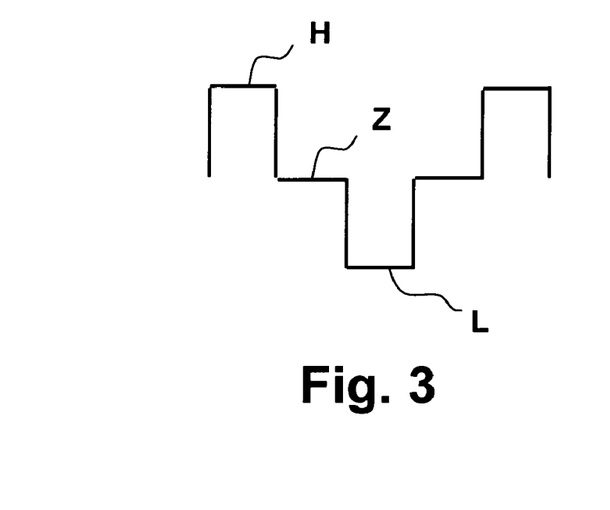
FIG. 3 is a diagram showing the three states.

Referring to FIG. 3, three transmission states are provided, which includes an "H" state, a "Z" state and an "L" state. The "H" state represents a high electric voltage level, the "Z" state represents a medium electric voltage level, and the "L" state represents a low electric voltage level. According to the present invention, by proper arrangement and combinations of the three transmission states to represent data, the start signal and the end signal, the receiving end can read those signals without clocks.

More specifically, one important feature of the present invention is that the signal transmission is achieved without clock synchronization between the transmission end and the receiving end. As such, it is presumed that there is no clock counting mechanism at the receiving end. Accordingly, if there are two or more equal states sequentially received at the receiving end, they may be identified as one single signal. For overcoming the above-mentioned problem, the present invention chooses anyone of the three states of the "H" state, the "Z" state and the "L" state to be a spacing bit. The function of the spacing bit is to separate two sequential equal states, or for use in other occasions where there may be confusion. For example, if the "Z" state is used as the spacing bit, the "Z" state can be interposed between two sequential "H" states or two sequential "L" states, so that the series of signals become "HZH" or "LZL" respectively, for better identification by the receiving end.

However, it is not enough to simply choose one of the three states of the "H" state, the "Z" state and the "L" state as the spacing bit, and the other two states as the data signals "0" and "1" respectively, for that the start and the end of the signals are not recognizable, and thus the transmission can not operate normally. The present invention accordingly provides a variety of combinations of the three states of the "H" state, the "Z" state and the "L" state to define the data signals, the start signal and the end signal, so that the start, the body, and the end of the data can be clearly identified.

Figure 4A:
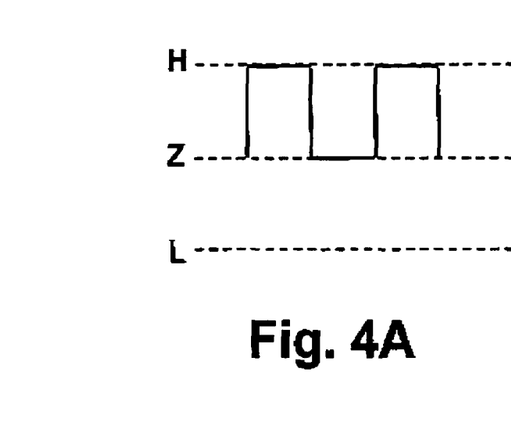
FIGS. 4A-4E are diagrams showing a method for single wire transmission without clock synchronization according to an embodiment of the present invention.
Figure 4B:
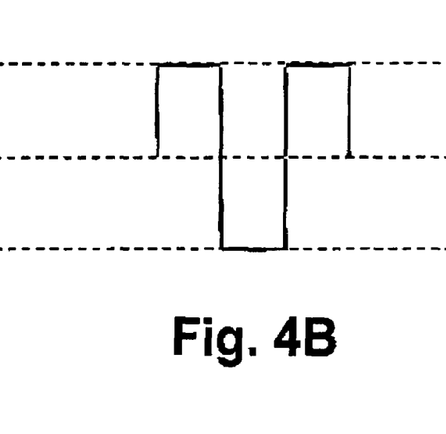
Figure 4C:
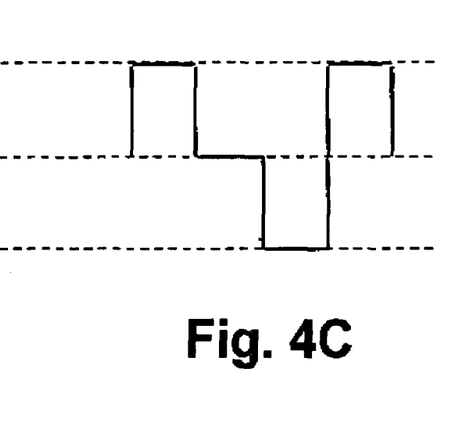
Figure 4D:
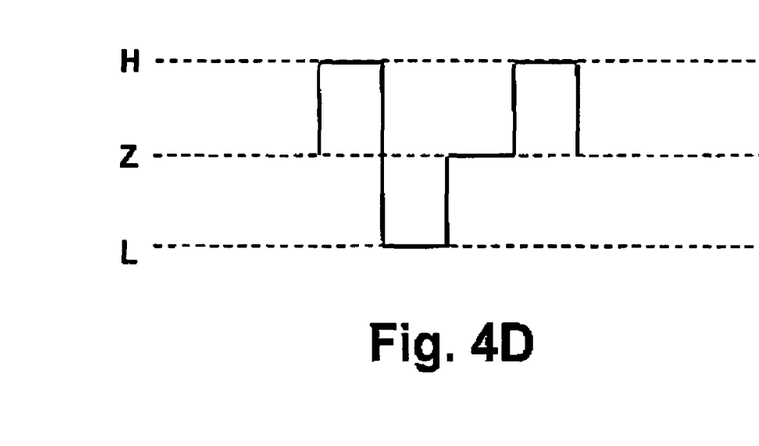

As an illustrative example, the "H" state is presumed to be the spacing bit herein, as shown in FIGS. 4A-4D. However, as mentioned in the foregoing, any one of the three states may be the spacing bit. When the "H" state is the spacing bit, the other two states "Z" and "L" can be arranged to provide the data signals "0" and "1", the start signal and the end signal. The embodiment of FIGS. 4A-4D shows the simplest form according to the present invention, in which the "H" state is the spacing bit; the "Z" state represents the data signal "1" (FIG. 4A); the "L" state represents the data signal "0" (FIG. 4B); the signal "ZL" is the start signal (FIG. 4C), and the signal "LZ" is the end signal (FIG. 4D). It should be noted that the above-mentioned four signals are each interchangeable with another, i.e., any one of the four signals of the "Z" state, the "L" state, the signal "ZL" and the signal "LZ" can be the data signal "0", the data signal "1", the start signal or the end signal. Thus, there are a total number of 4!=4×3×2×1=24 variety possibilities. However, since the data signal is more often used than the start signal and the end signal, it is preferred that the data signal is expressed in a shorter way (FIGS. 4A-4B) than the start signal and the end signal. The above also applies to the case where the "L" state is used as the spacing bit.

FIGS. 5A-5D is another embodiment of the present invention, which uses the "Z" state as the spacing bit.

Figure 4E:
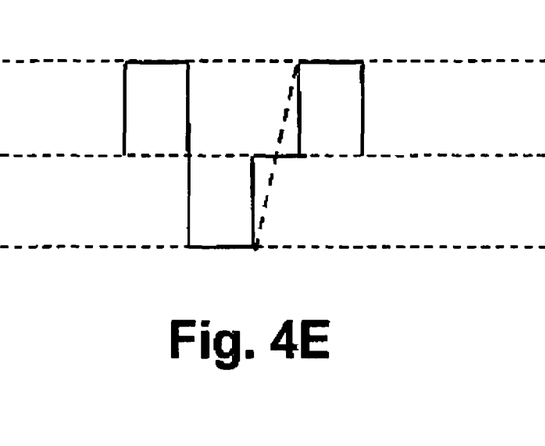

However, the foregoing embodiments are not perfectly satisfactory. Since there is no clock counting mechanism at the receiving end, as shown in FIG. 4E, if the "Z" state is too short, it may not be recognizable at the receiving end. Thus, the signal shown in FIG. 4D may be misread as the signal shown in FIG. 4B. If the signal shown in FIG. 4D is set to be an end signal, the receiving end may not correctly identify the ending of the data. If the signal shown in FIG. 4D is set to be some other signal, other errors or misreading problems may be generated.

Figure 5A:
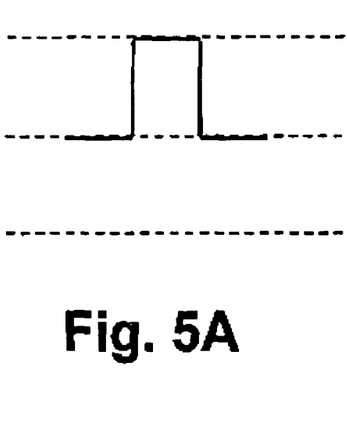
FIGS. 5A-5E are diagrams showing a method for single wire transmission without clock synchronization according to another embodiment of the present invention.
Figure 5B:
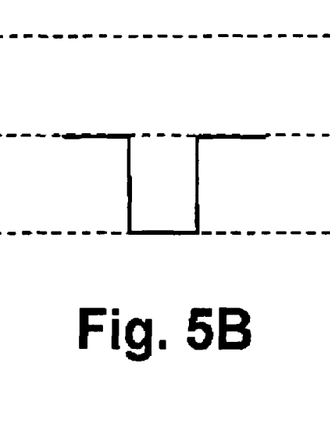
Figure 5C:
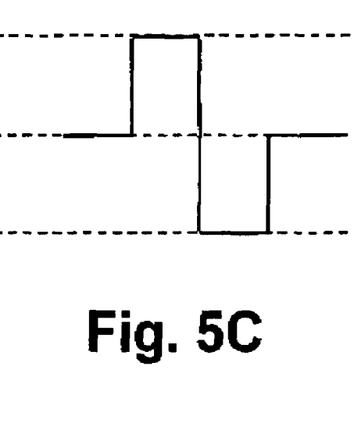
Figure 5D:
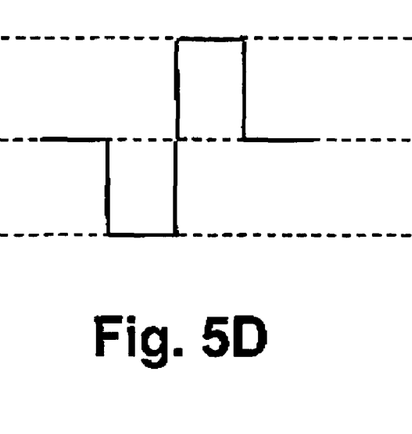
Figure 5E:
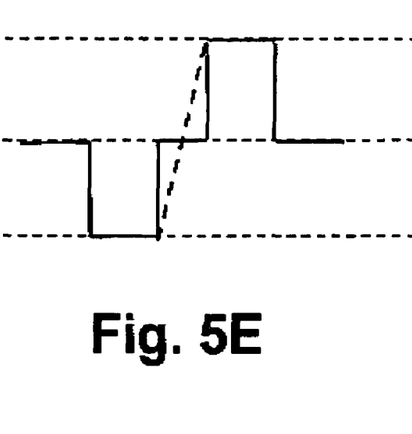

The embodiment of FIGS. 5A-5D also faces the above-mentioned problem. As shown in FIG. 5E, a combination of the signals shown in FIG. 5B and FIG. 5A may be misread as the signal shown in FIG. 5D.

The foregoing imperfection is not a serious problem because it can easily be resolved by controlling the length of the period of the medium level "Z" state. However, it would be better to be free from such concern.

Figure 6A:
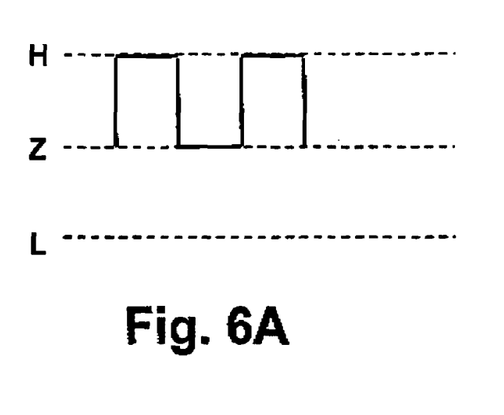
FIGS. 6A-6D are diagrams showing a method for single wire transmission without clock synchronization according to yet another embodiment of the present invention.
Figure 6B:
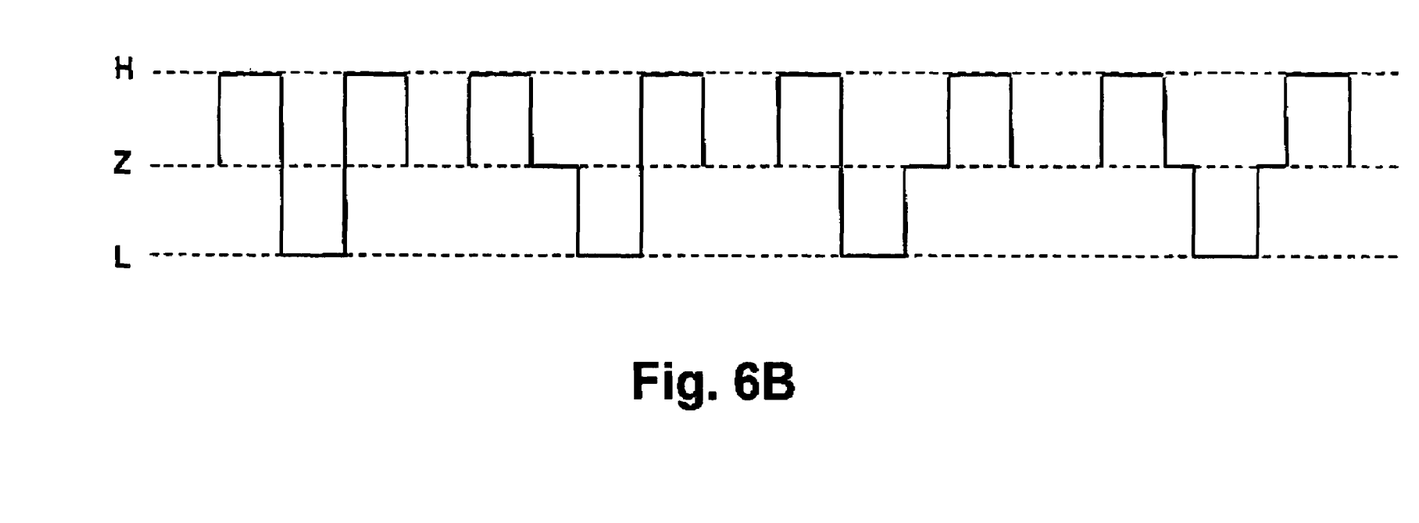
Figure 6C:
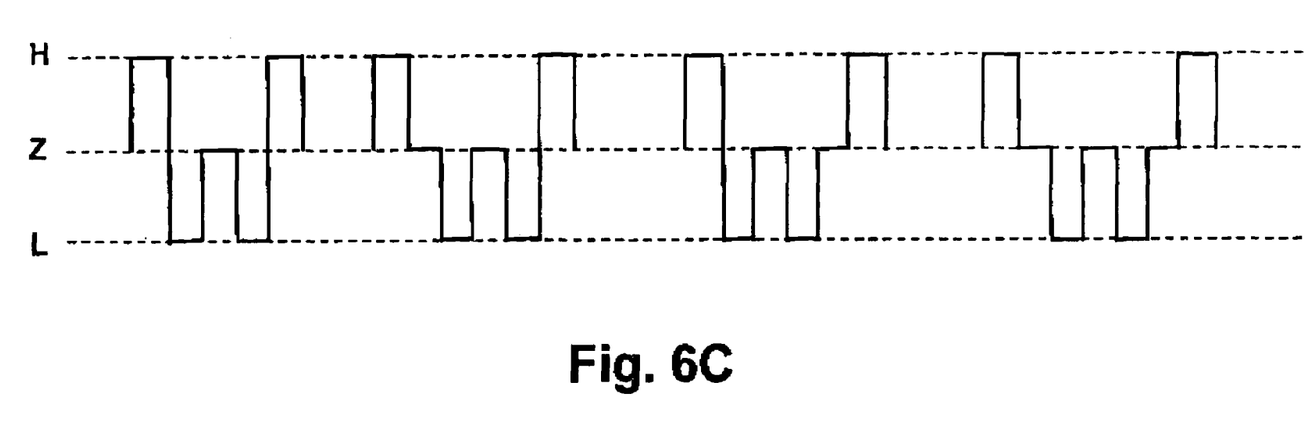
Figure 6D:
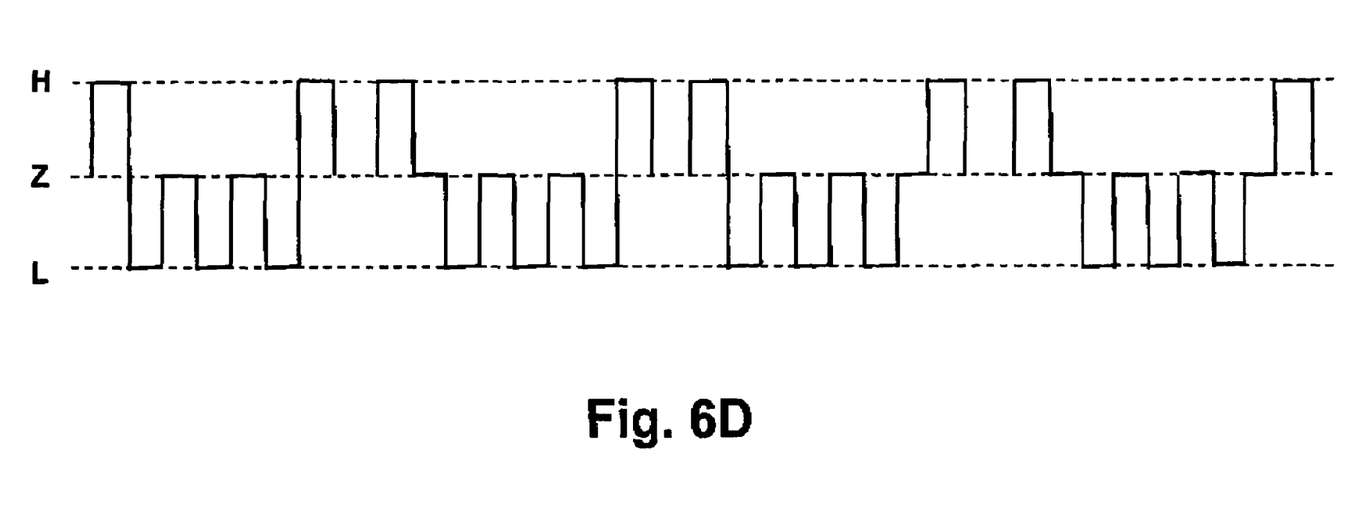

FIGS. 6A-6D shows another embodiment of the present invention. For illustrative purpose, the "H" state is set to be the spacing bit. It is noted that the scheme is very much alike if the "L" state is the spacing bit. In this embodiment, the number of occurrence of the other extreme voltage level, the "L" state in the shown figures, defines the meaning of the signals. (The extreme voltage levels include the high voltage level "H" and the low voltage level "L". Where "H" is the spacing bit, "L" is the other extreme voltage level, and vice versa, where "L" is the spacing bit, "H" is the other extreme voltage level.) As shown in FIGS. 6A-6D, the data "0" may be defined by zero occurrence of the other extreme voltage level (FIG. 6A). The data "1" may be defined by once occurrence of the other extreme voltage level (as shown in FIG. 6B, wherein there are four situations representing the same meaning). The start signal is defined by twice occurrence of the other extreme voltage level (as shown in FIG. 6C, wherein there are four situations representing the same meaning). The end signal is defined by three times occurrence of the other extreme voltage level (as shown in FIG. 6D, wherein there are four situations representing the same meaning). Of course, the four definitions of the signals as shown in the four figures are each interchangeable another. The arrangement shown in FIGS. 6A-6D is a preferred one for better efficiency.

In the case where the "Z" state is the spacing bit, the data signals, the start signal and the end signal can be defined by the number of occurrence of any one of the extreme voltage levels (the "H" state or the "L" state). This arrangement requires a more complicated circuit, but is still within the scope of the present invention.

There are other methods for defining the data signals, the start signal and the end signal to resolve the above-mentioned problem that the receiving end could not easily recognize a signal because the medium voltage level "Z" is too short. More specifically, if any one of the "H" state, the "Z" state and the "L" state is set to be a spacing bit, the foregoing problem can be resolved by interposing a spacing bit between any two sequential states regardless whether the two sequential states are equal or not. In detail, the recognition problem results from confusion between the series of bits of "HZL" and "HL", and between the series of bits of "LZH" and "LH". According to the present invention, when the "H" state (or the "L" state) is set to be a spacing bit, and the other two states—the "L" state and the "Z" state (or the "H" state and the "Z" state)—are used for defining different kinds of signals, if a spacing bit is interposed between the other two states of the "L" state and the "Z" state (or the "H" state and the "Z" state), the series of bits of "HZL" or "LZH" would not appear. On the other hand, if the "Z" state is set to be a spacing bit, and a spacing bit is always interposed between the other two states of the "H" state and the "L" state, the foregoing confusion problem can be resolved even though the series of bits of "HZL" and "LZH" appear, because they mean the same as the series of bits of "HL" and "LH". Therefore, even if there is confusion, the receiving end would not misread the signals.

However, to adopt the foregoing method of interposing a spacing bit between any two bits, the data signals of "0" and "1", the start signal and the end signal should be carefully defined. Since a signal could include more than one bit, and the receiving end may start reading the signals from any bit, it is possible that two signals are misread as one single signal, or a rear half of a signal and a front half of a signal are combined and misread as one signal. Such misreading is called "misalignment" in the present invention.

Figure 7A:
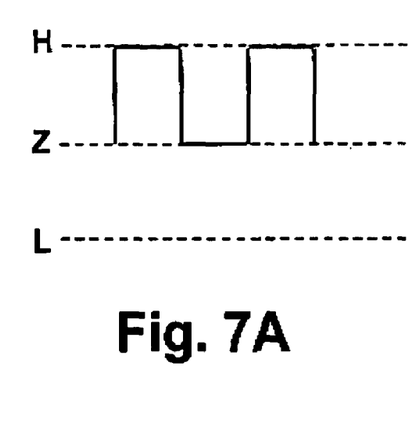
FIGS. 7A-7E are diagrams showing a method for single wire transmission without clock synchronization according to yet another embodiment of the present invention, which might result in some signal confusions.
Figure 7B:
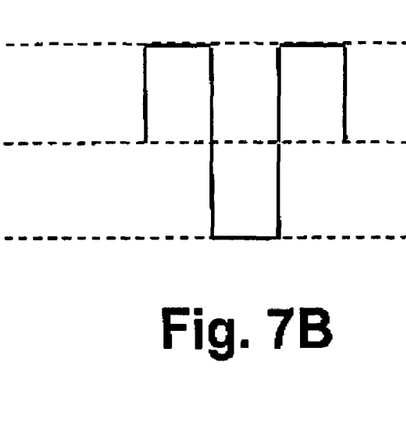
Figure 7C:
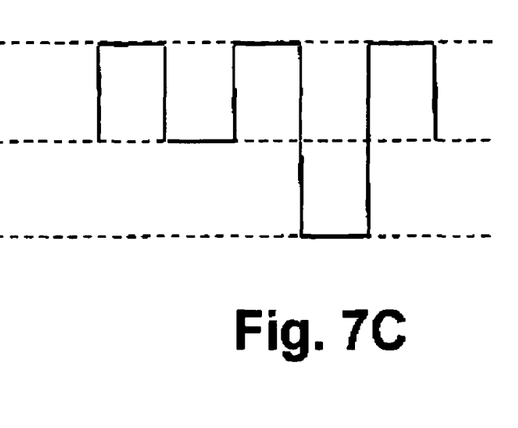
Figure 7D:
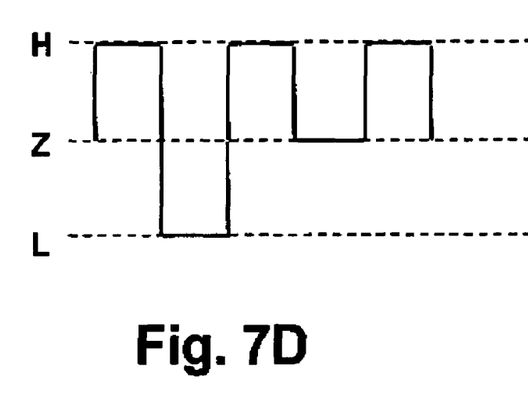
Figure 7E:
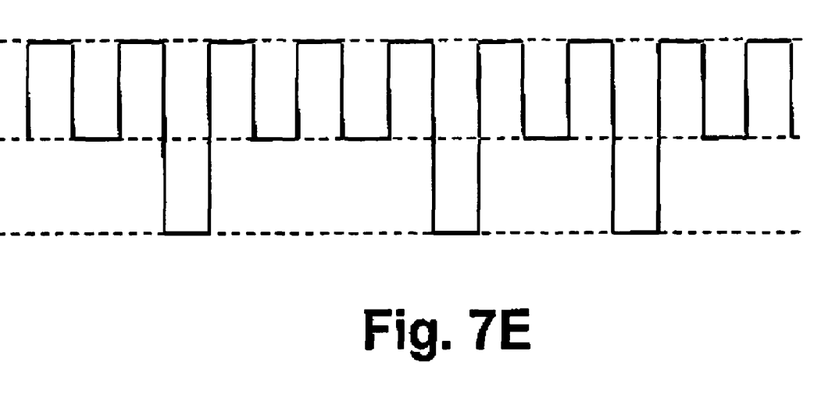

For example, referring to FIGS. 7A-7E, wherein the "H" state is the spacing bit, the signal "HZH" represents the data signal "1", the signal "HLH" represents the data signal "0", the signal "HZHLH" represents the start signal, and the signal "HLHZH" represents the end signal. If a signal stream shown in FIG. 7E is received at the receiving end, it is difficult for the receiving end to identify where data begins and where data ends, because the first bit of the signal stream may not be the beginning of a signal, and the combination of bits "HLHZH" may mean two data signals "01", or the end signal.

To resolve this problem, the present invention provides another embodiment as below. According to this embodiment, besides the spacing bit, three state bits are used for defining the data signals "0" and "1", the start signal and the end signal. Thus, the start signal and the end signal can be identified correctly at the receiving end, and the data signal would never be misread as the start signal or the end signal.

More specifically, according to the embodiment, any one of the three states of the "H" state, the "Z" state and the "L" state can be defined as the spacing bit. If the "H" state is defined as the spacing bit, the three-bit combinations of the "Z" state and the "L" state that can be used for defining the data signals "0" and "1", the start signal and the end signal are listed as follows (the spacing bit of the "H" state is omitted herein).

TABLE 1

|   | data "0"/data "1" (interchangeable) | start signal/end signal (interchangeable) |
|---|---|---|
| 1 | ZZZ/ZZL | LZL/LLL |
| 2 | ZZZ/ZLL | ZLZ/LLL |
| 3 | ZZZ/LZZ | LZL/LLL |
| 4 | ZZZ/LLZ | ZLZ/LLL |
| 5 | ZZL/ZLL | ZZZ/LLL |
| 6 | ZZL/LZZ | LZL/LLL |
| 7 | ZZL/LZL | ZZZ/LLL |
| 8 | ZZL/LLL | ZZZ/LZL |
| 9 | ZLZ/ZLL | ZZZ/LLL |
| 10 | ZLZ/LZL | ZZZ/LLL |
| 11 | ZLZ/LLZ | ZZZ/LLL |
| 12 | ZLL/LLZ | ZZZ/ZLZ |
| 13 | ZLL/LLL | ZZZ/ZLZ |
| 14 | LZZ/LZL | ZZZ/LLL |
| 15 | LZZ/LLZ | ZZZ/LLL |
| 16 | LZZ/LLL | ZZZ/LZL |
| 17 | LLZ/LLL | ZZZ/ZLZ |

Figure 8:
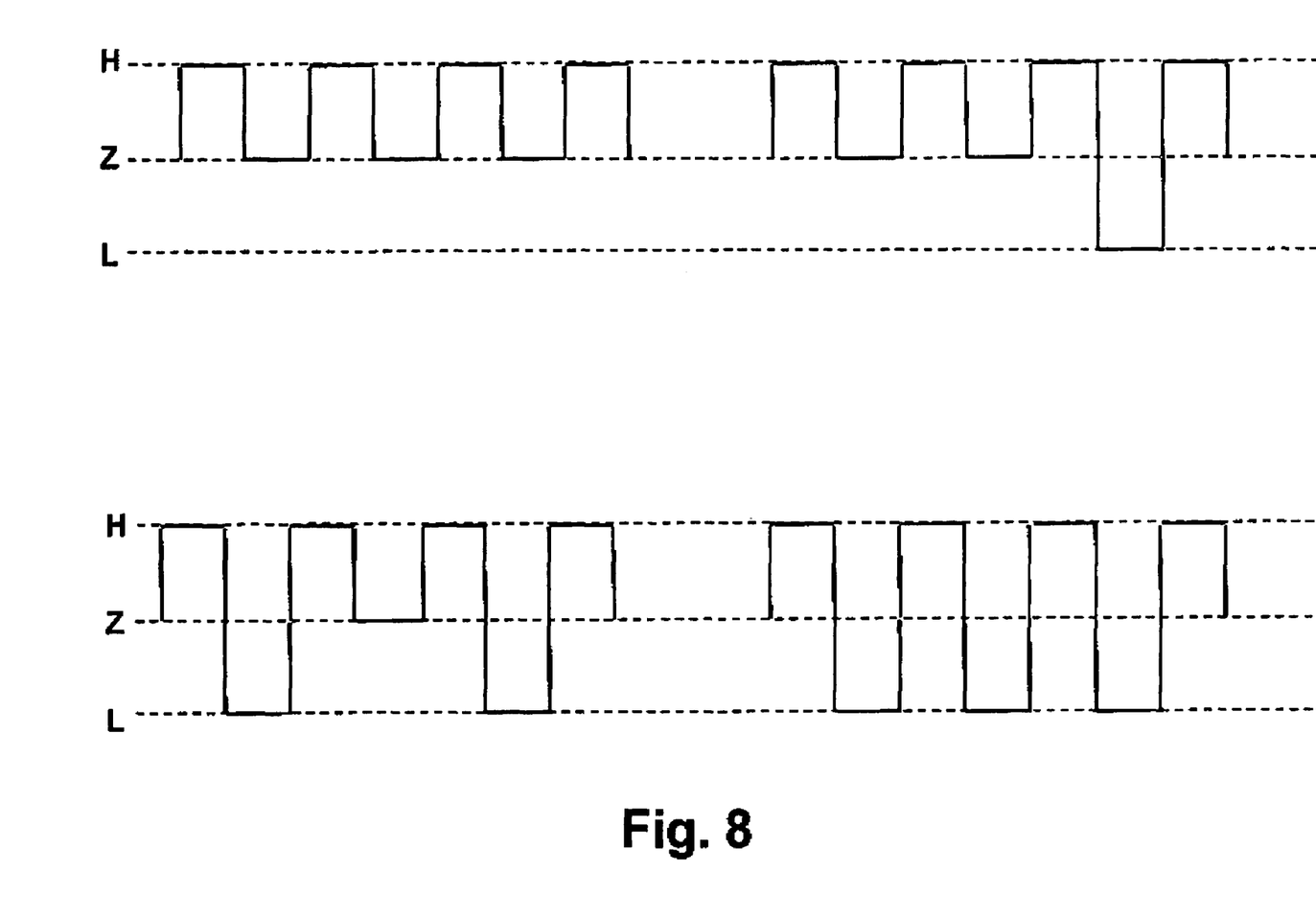
FIG. 8 is a diagram showing a method for single wire transmission without clock synchronization according to another embodiment of the present invention, which illustrates only one of the many possible combinations of signal definitions.

As shown in the table 1, in the above seventeen combinations, the data signals "0" and "1" are interchangeable with each other, and the start signal and the end signal are interchangeable with each other. Thus, there are total 17×2×2=68 combinations of signal definitions. Within the 68 combinations, every start signal and end signal can not be misread by misalignment. For example, referring to the first combination, the signal "LZL" can not be generated by any combinations and misalignment of the other signals "ZZZ", "ZZL" and "LLL", and likewise, the signal "LLL" can not be generated by any combinations and misalignment of the other signals "ZZZ", "ZZL" and "LZL". Therefore, if the signals "LZL" and "LLL" are defined as the start signal and the end signal respectively, there would be no misreading at the receiving end. FIG. 8 illustrates the signal waveform of this combination.

In addition, if the "Z" state or the "L" state is defined as the spacing bit, there are also 68 combinations of signal definitions each, as one skilled in the art would reason by analogy from the present invention, and the details thereof is omitted herein.

Figure 9A:
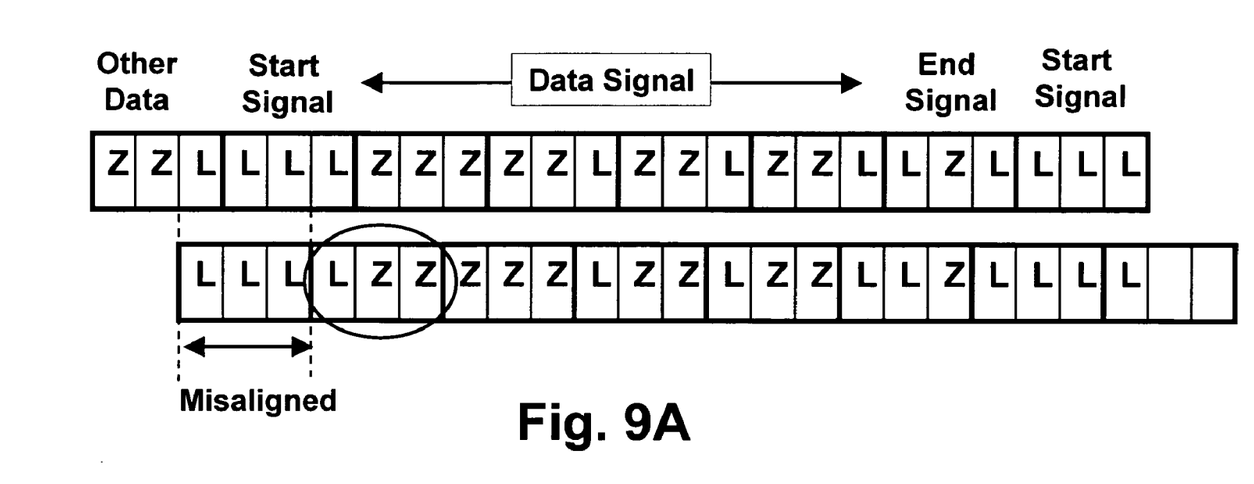
FIGS. 9A and 9B are diagrams showing two scenarios where signal confusions (which are not serious issues, however) might result from the embodiment of FIG. 8.

Furthermore, still assuming the "H" state to be the spacing bit, and taking the first combination as an example, it is still possible to misread a signal by misalignment; however, since a complete series of signals should include a start signal, data, and an end signal, the receiving end may judge and correct the misalignment according to such signal format arrangement. For example, as shown in FIG. 9A, a stream of signals (the spacing bit of the "H" state is omitted herein) is received at the receiving end, in which the first series of three bits (the spacing bit is not counted) belong to another series of signals, while the actual beginning of the present series of signals starts from the start signal (i.e. the second series of three bits) to the end signal. The first series of three bits is not an end signal of a previous series; one possible reason for this may be that a previous transmitting process is abandoned within a common communication channel during transmitting signals from a transmitting end to another receiving end. As shown in the lower part of FIG. 9A, since the receiving end may start reading from any bit, it may misread the start signal by misalignment. However, since the following three bits are not a meaningful signal, the receiving end may find out such an error instantly, and the correct start signal can be resumed at the receiving end through suitable error correction mechanism.

Figure 9B:
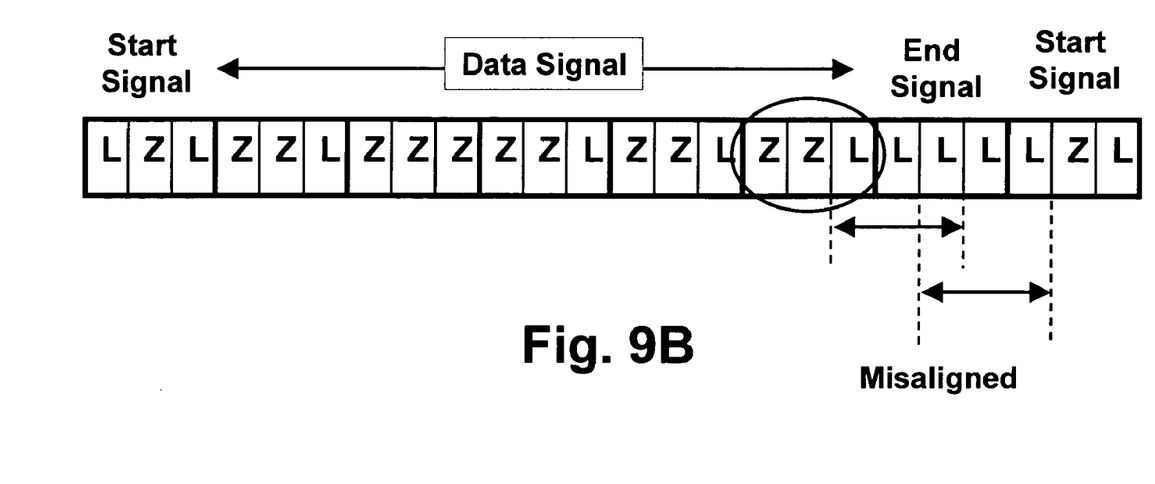

As another example, please refer to the stream of signals in FIG. 9B wherein the definitions of the start signal and the end signal are exchanged from the example in FIG. 9A. As shown in the right part of FIG. 9B, the end signal could be misread by misalignment at the receiving end. However, since the receiving end has correctly recognized the start signal, it would take the circled bits as a data signal, and thus it can identify the end signal correctly.

In brief, if three bits (excluding the spacing bit) are used for defining the data signals "0" and "1", the start signal and the end signal, in which the start signal and the end signal are properly defined so that they can not be misread by misalignment of other signals, then even one of the start signal and the end signal is misaligned, the receiving end is still able to decipher the complete stream of signals.

Figure 10A:
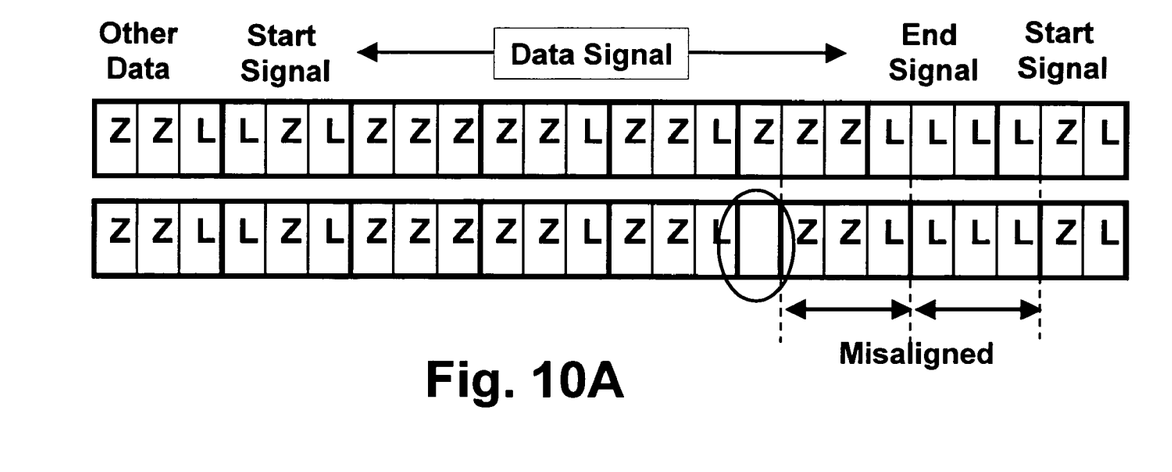
FIG. 10A is a diagram showing another scenario where signal confusion (again, which is not a serious issue) might result from the embodiment of FIG. 8.

Another embodiment of the present invention will be described hereinafter. As mentioned above, where three bits are used for defining the signals, the start signal and the end signal would not be misread by misalignment of other signals. However, the data signal might still be misread by misalignment of other signals. Taking the first combination shown in Table 1 as an example, a misaligned combination of the data signal "ZZZ" and the start or end signal "LZL" or "LLL" could generate the misread signal "ZZL". This is not a serious problem because, when the receiving end receives a stream of signals, it will decipher the start signal first, and decipher the following signals of the stream by a length of every three bits. Thus, data misalignment can hardly occur. However, if the transmission is unstable, causing loss of one or more of the bits of the data signals, such error might not be detected immediately. As shown in FIG. 10A, if a bit in the circle is lost, the last data signal and the end signal would be misread by misalignment. Since the following three bits can not form a meaningful signal, the misalignment or misreading can still be detected and corrected by error correction mechanism. But of course, it is better if the misalignment or misreading can be detected immediately.

In view of the above, another embodiment of the present invention is provided to resolve the above-mentioned problem. According to this embodiment of the present invention, none of the data signals, the start signal and the end signal can be formed by the misalignment of other signals. Furthermore, in some preferred combinations, lost of any data bit can be detected immediately.

For illustrative purpose, the "H" state is defined as the spacing bit. In this embodiment, four state bits are used to define the data signals "0" and "1", the start signal and the end signal, as shown in the following Table 2.

TABLE 2

| | data "0"/data "1"/start signal/end signal (each interchangeable with another) |
|---|---|
| 1 | ZZZZ/ZZLZ/ZLLZ/ZLLL |
| 2 | ZZZZ/ZZLZ/ZLLZ/LLLZ |
| 3 | ZZZZ/ZZLZ/ZLLZ/LLLL |
| 4 | ZZZZ/ZZLZ/LLZL/LLLL |
| 5 | ZZZZ/ZZLL/LZLZ/LZLL |
| 6 | ZZZZ/ZLZZ/ZLLZ/ZLLL |
| 7 | ZZZZ/ZLZZ/ZLLZ/LLLZ |
| 8 | ZZZZ/ZLZZ/ZLLZ/LLLL |
| 9 | ZZZZ/ZLZZ/LZLL/LLLL |
| 10 | ZZZZ/ZLZL/ZLLZ/ZLLL |
| 11 | ZZZZ/ZLZL/ZLLZ/LLLZ |
| 12 | ZZZZ/ZLZL/ZLLZ/LLLL |

TABLE 2-continued

| | data "0"/data "1"/start signal/end signal (each interchangeable with another) |
|---|---|
| 13 | ZZZZ/ZLZL/LZZL/LLZL |
| 14 | ZZZZ/ZLZL/LZZL/LLLL |
| 15 | ZZZZ/ZLZL/LLZZ/LLZL |
| 16 | ZZZZ/ZLLZ/ZLLL/LZLZ |
| 17 | ZZZZ/ZLLZ/LZLZ/LLLZ |
| 18 | ZZZZ/ZLLZ/LZLZ/LLLL |
| 19 | ZZZZ/LZZL/LZLZ/LZLL |
| 20 | ZZZZ/LZZL/LZLZ/LLLL |
| 21 | ZZZZ/LZZL/LZLL/LLLL |
| 22 | ZZZZ/LZZL/LLZL/LLLL |
| 23 | ZZZL/ZLZL/LZZL/LLLL |
| 24 | ZZZL/LZZL/LZLZ/LLLL |
| 25 | ZZZL/LZZL/LZLL/LLLL |
| 26 | ZZZL/LZZL/LLZL/LLLL |
| 27 | ZZLZ/ZZLL/LZLZ/LLLL |
| 28 | ZZLZ/ZLLZ/LZLZ/LLLL |
| 29 | ZLZZ/ZLZL/ZLLZ/LLLL |
| 30 | ZLZZ/ZLZL/LZZL/LLLL |
| 31 | ZLZL/LZZZ/LZZL/LLLL |
| 32 | LZZZ/LZZL/LZLZ/LLLL |
| 33 | LZZZ/LZZL/LZLL/LLLL |
| 34 | LZZZ/LZZL/LLZL/LLLL |
| 35 | ZZZL/ZLZL/LZZL/LLZL |
| 36 | ZZZL/LZZL/LZLZ/LZLL |
| 37 | ZZLZ/ZLLZ/ZLLL/LZLZ |
| 38 | ZZLZ/ZLLZ/LZLZ/LLLZ |
| 39 | ZLZZ/ZLZL/ZLLZ/ZLLL |
| 40 | ZLZZ/ZLZL/ZLLZ/LLLZ |
| 41 | ZLZL/LZZZ/LZZL/LLZL |
| 42 | LZZZ/LZZL/LZLZ/LZLL |

There are 42 combinations for signal definitions, as shown in Table 2, wherein each signal definition in a combination is interchangeable with another in the same combination, for the data signals "0" and "1", the start signal and the end signal. Thus, there are 4!=4×3×2×1=24 possible arrangements in every combination, and a total of 42×24=1008 possible arrangements. Likely, if "Z" or "L" is defined as the spacing bit, there are 1008 possible arrangements each.

Figure 10B:
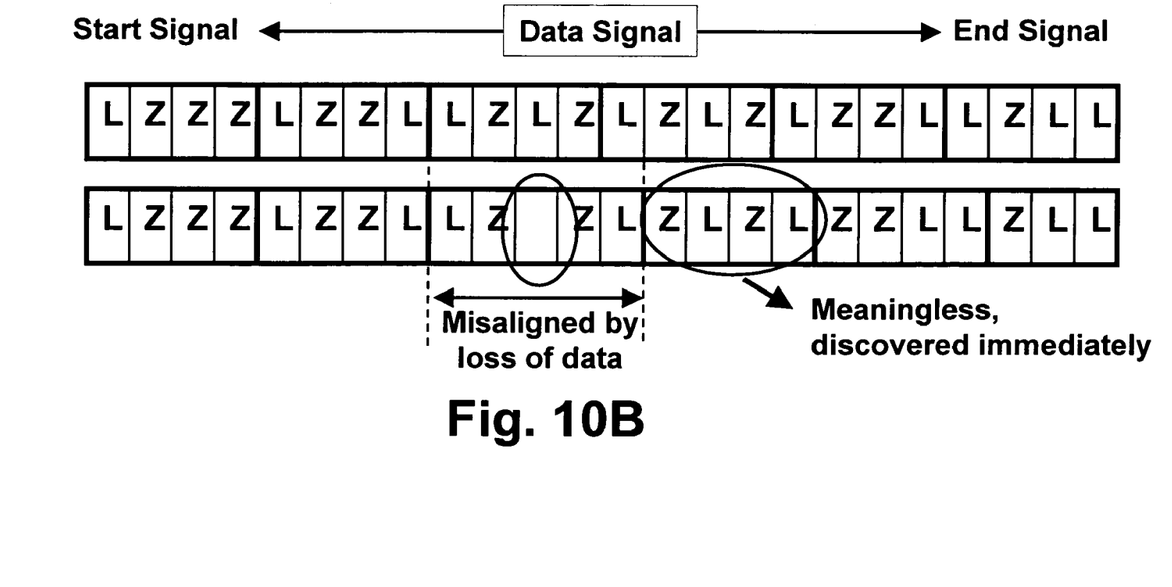
FIG. 10B is a diagram showing a method for single wire transmission without clock synchronization according to yet another embodiment of the present invention, which can resolve the signal confusions of FIGS. 9A, 9B and 10A; this diagram illustrates only one of the many possible combinations of signal definitions.

In all the above signal definition combinations, none of the data signals, the start signal and the end signal can be generated by misalignment of other signals. In addition, from the 35th combination to the 42nd combination, the bit series "ZZZZ" and "LLLL" are not used. This is an important feature because, in these 8 combinations, none of the data signals, the start signal and the end signal would be misread by misalignment of other signals and itself. More specifically, taking the 42nd combination as an example, the signal "LZZZ" would not be generated by any misaligned combinations of the other signals "LZZL", "LZLZ" and "LZLL", and the signal "LZZZ" itself. Therefore, if a lost bit causes misreading, such error can be found instantly at the next signal at the receiving end, as shown in FIG. 10B.

Similarly, each of the 8 preferred combinations, from the 35th combination to the 42nd combination, further includes a variety of 4!=4×3×2×1=24 possible arrangements. Thus, there are total 8×24=192 combinations for signal difitions. By analogy, if "Z" or "L" is set to be the spacing bit, there are also 192 combinations each.

Where four state bits are used for defining signals, according to the above 8 preferred combinations, one-bit misalignment or loss can be detected immediately, because the next signal is meaningless. However, to instantly detect two-bit or more-bit misalignment or loss requires five state bits.

According to the analysis of the inventors, when using five state bits for defining signals, there are over 1400×3 (the "H", "Z" or "L" state as the spacing bit) combinations, in which two- or more-bit misalignment or loss can be detected instantly. The number of combinations is too large that the detailed list can not be shown herein. Table 3 shows only some examples; one skilled in the art may reason by analogy for the rest.

TABLE 3 data "0"/data "1"/start signal/end signal
(each interchangeable with another;
"H" being the spacing bit)

| | |
|---|---|
| 1 | ZZZZL/ZZZLL/ZZLZL/ZZLLL |
| 2 | ZZZZL/ZZZLL/ZLZZL/ZLLLL |
| 3 | ZZZLZ/ZZLLZ/ZZLLL/LZLLL |

The present invention has been described in considerable detail with reference to certain preferred embodiments thereof, which are illustrative of the spirit of the invention rather than limiting the scope of the invention. Various other substitutions and modifications will occur to those skilled in the art, without departing from the spirit of the present invention. For example, a method using fewer number of bits for defining signals can certainly be replaced by a method using more number of bits for defining signals. As an example, the embodiment shown in FIGS. 6A-6D uses zero, once, twice and three times occurrence of an extreme voltage level to define the data signals, the start signal and the end signal. Of course, to use a larger number of occurrence, such as 3, 4, 5 and 6 times occurrence of the extreme voltage levels for signal definitions, are also within the scope of the present invention. As another example, the embodiment shown in Table 1 uses three state bits to achieve the function that both the start signal and the end signal would not be misread by misalignment of other signals. The same function is of course readily achievable by four or more bits, and there are more than 42 combinations (not only those shown in Table 2) to do so. Therefore, all modifications and variations based on the present invention should be interpreted to fall within the scope of the following claims and their equivalents.

What is claimed is:

1. A method for transmitting signals through single wire transmission between a transmitter circuit and a receiver circuit without clock synchronization, comprising:
    transmitting signals having at least three states from the transmitter circuit, or receiving signals having at least three states by the receiver circuit, the signals including a start signal, an end signal, spacing bits and data bits,
    wherein each of the spacing bits consists of a first state of the three states,
    wherein the data bits are expressed by a second state and a third state of the three states, with at least one spacing bit between every two of the data bits, and
    wherein the start signal and the end signal respectively include a number of continuous interleaving occurrence of the second state and the third state without the spacing bit in between.

2. The method for transmitting signals through single wire transmission between the transmitter circuit and the receiver circuit without clock synchronization as claimed in claim 1, wherein the three states includes a high voltage level, a medium voltage level and a low voltage level, and the first state is the high voltage level or the low voltage level.

3. The method for transmitting signals through single wire transmission between the transmitter circuit and the receiver circuit without clock synchronization as claimed in claim 1, wherein the spacing bit is provided before and after every signal of the data signals, the start signal and the end signal.

4. A method for transmitting signals through single wire transmission between a transmitter circuit and a receiver circuit without clock synchronization, comprising:
    transmitting signals having at least three states from the transmitter circuit, or receiving signals having at least three states by the receiver circuit, the signals including spacing bits and signal defining bits to express a start signal, an end signal and data signals,
    wherein each of the spacing bits consists of a first state of the three states,
    wherein the signal defining bits are expressed by a second state and a third state of the three states, with at least one spacing bit between every two of the signal defining bits; and
    wherein the data signals, start signal and end signal each includes at least three of the signal defining bits,
    whereby either (1) a misaligned combination of the data signals and the end signal does not generate the start signal or (2) a misaligned combination of the data signals and the start signal does not generate the end signal.

5. The method for transmitting signals through single wire transmission between the transmitter circuit and the receiver circuit without clock synchronization as claimed in claim 4, wherein the first state, the second state and the third state are respectively represented by "A", "B" and "C", and the data signals, the start signal and the end signal are defined by one of the following combinations.

| | data "0"/data "1" (interchangeable) | start signal/end signal (interchangeable) |
|---|---|---|
| 1 | BBB/BBC | CBC/CCC |
| 2 | BBB/BCC | BCB/CCC |
| 3 | BBB/CBB | CBC/CCC |
| 4 | BBB/CCB | BCB/CCC |
| 5 | BBC/BCC | BBB/CCC |
| 6 | BBC/CBB | CBC/CCC |
| 7 | BBC/CBC | BBB/CCC |
| 8 | BBC/CCC | BBB/CBC |
| 9 | BCB/BCC | BBB/CCC |
| 10 | BCB/CBC | BBB/CCC |
| 11 | BCB/CCB | BBB/CCC |
| 12 | BCC/CCB | BBB/BCB |
| 13 | BCC/CCC | BBB/BCB |
| 14 | CBB/CBC | BBB/CCC |
| 15 | CBB/CCB | BBB/CCC |
| 16 | CBB/CCC | BBB/CBC |
| 17 | CCB/CCC | BBB/BCB. |

6. The method for transmitting signals through single wire transmission between the transmitter circuit and the receiver circuit without clock synchronization as claimed in claim 5, wherein the "A" state is a high voltage level, a medium voltage level or a low voltage level.

7. A method for transmitting signals through single wire transmission between a transmitter circuit and a receiver circuit without clock synchronization, comprising:
    transmitting signals having at least three states; from the transmitter circuit, or receiving signals having at least three states by the receiver circuit, the signals including spacing bits and signal defining bits to express a start signal, an end signal and data signals,
    wherein each of the spacing bits consists of a first state of the three states,
    wherein the signal defining bits are expressed by a second state and a third state of the three states, with at least one spacing bit between every two of the signal defining bits; and wherein the data signals, start signal and end signal each includes at least four of the signal defining bits, whereby either (1) a misaligned combination of any one or more of the data signals, the start signal and the end signal does not generate any other of the data signals, the start signal and the end signal, or (2) a misaligned combination of any one or more of the data signals, the start signal and the end signal does not generate the signal itself or any other of the data signals, the start signal and the end signal.

8. The method for transmitting signals through single wire transmission between the transmitter circuit and the receiver circuit without clock synchronization as claimed in claim 7, wherein the first state, the second state and the third state are respectively represented by "A", "B" and "C", and the data signals, the start signal and the end signal are defined by one of the following combinations.

|  | data "0"/data "1"/start signal/end signal (each interchangeable with another) |
|---|---|
| 1 | BBBB/BBCB/BCCB/BCCC |
| 2 | BBBB/BBCB/BCCB/CCCB |
| 3 | BBBB/BBCB/BCCB/CCCC |
| 4 | BBBB/BBCB/CCBC/CCCC |
| 5 | BBBB/BBCC/CBCB/CBCC |
| 6 | BBBB/BCBB/BCCB/BCCC |
| 7 | BBBB/BCBB/BCCB/CCCB |
| 8 | BBBB/BCBB/BCCB/CCCC |
| 9 | BBBB/BCBB/CBCC/CCCC |
| 10 | BBBB/BCBC/BCCB/BCCC |
| 11 | BBBB/BCBC/BCCB/CCCB |
| 12 | BBBB/BCBC/BCCB/CCCC |
| 13 | BBBB/BCBC/CBBC/CCBC |
| 14 | BBBB/BCBC/CBBC/CCCC |
| 15 | BBBB/BCBC/CCBB/CCBC |
| 16 | BBBB/BCCB/BCCC/CBCB |
| 17 | BBBB/BCCB/CBCB/CCCB |
| 18 | BBBB/BCCB/CBCB/CCCC |
| 19 | BBBB/CBBC/CBCB/CBCC |
| 20 | BBBB/CBBC/CBCB/CCCC |
| 21 | BBBB/CBBC/CBCC/CCCC |
| 22 | BBBB/CBBC/CCBC/CCCC |
| 23 | BBBC/BCBC/CBBC/CCCC |
| 24 | BBBC/CBBC/CBCB/CCCC |
| 25 | BBBC/CBBC/CBCC/CCCC |
| 26 | BBBC/CBBC/CCBC/CCCC |
| 27 | BBCB/BBCC/CBCC/CCCC |
| 28 | BBCB/BCCB/CBCB/CCCC |
| 29 | BCBB/BCBC/BCCB/CCCC |
| 30 | BCBB/BCBC/CCBB/CCCC |
| 31 | BCBC/CBBB/CBBC/CCCC |
| 32 | CBBB/CBBC/CBCB/CCCC |
| 33 | CBBB/CBBC/CBCC/CCCC |
| 34 | CBBB/CBBC/CCBC/CCCC. |

9. The method for transmitting signals through single wire transmission between the transmitter circuit and the receiver circuit without clock synchronization as claimed in claim 7, wherein the first state, the second state and the third state are respectively represented by "A", "B" and "C", and the data signals, the start signal and the end signal are defined by one of the following combinations.

|  | data "0"/data "1"/start signal/end signal (each interchangeable with another) |
|---|---|
| 1 | BBBC/BCBC/CBBC/CCBC |
| 2 | BBBC/CBBC/CBCB/CBCC |
| 3 | BBCB/BCCB/BCCC/CBCB |
| 4 | BBCB/BCCB/CBCB/CCCB |
| 5 | BCBB/BCBC/BCCB/BCCC |
| 6 | BCBB/BCBC/BCCB/CCCB |
| 7 | BCBC/CBBB/CBBC/CCBC |
| 8 | CBBB/CBBC/CBCB/CBCC. |

10. The method for transmitting signals through single wire transmission between the transmitter circuit and the receiver circuit without clock synchronization as claimed in claim 8, wherein the "A" state is a high voltage level, a medium voltage level or a low voltage level.

11. The method for transmitting signals through single wire transmission between the transmitter circuit and the receiver circuit without clock synchronization as claimed in claim 9, wherein the "A" state is a high voltage level, a medium voltage level or a low voltage level.

12. A method for transmitting signals through single wire transmission between a transmitter circuit and a receiver circuit without clock synchronization, comprising:

transmitting signals having at least three states; from the transmitter circuit, or receiving signals having at least three states by the receiver circuit, the signals including spacing bits and signal defining bits to express a start signal, an end signal and data signals, wherein each of the spacing bits consists of a first state of the three states, wherein the signal defining bits are expressed by a second state and a third state of the three states, with at least one spacing bit between every two of the signal defining bits; and wherein the data signals, start signal and end signal each includes at least five of the signal defining bit, whereby a multi-bit misaligned combination of any one or more of the data signals, the start signal and the end signal does not generate the signal itself or any other of the data signals, the start signal and the end signal.

* * * * *